(12) United States Patent
Crabtree et al.

(10) Patent No.: US 12,238,143 B2
(45) Date of Patent: Feb. 25, 2025

(54) SYSTEM FOR AUTOMATED CAPTURE AND ANALYSIS OF BUSINESS INFORMATION FOR RELIABLE BUSINESS VENTURE OUTCOME PREDICTION

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 0 days.

(21) Appl. No.: 18/582,568

(22) Filed: Feb. 20, 2024

(65) Prior Publication Data

US 2024/0195843 A1 Jun. 13, 2024

Related U.S. Application Data

(63) Continuation of application No. 17/189,161, filed on Mar. 1, 2021, which is a continuation-in-part of application No. 17/061,195, filed on Oct. 1, 2020, now Pat. No. 11,570,214, which is a continuation-in-part of application No. 17/035,029, filed on Sep. 28, 2020, now Pat. No. 11,546,380, (Continued)

(51) Int. Cl.
*H04L 9/40* (2022.01)
*G06F 16/2458* (2019.01)
*G06F 16/951* (2019.01)

(52) U.S. Cl.
CPC .......... *H04L 63/20* (2013.01); *G06F 16/2477* (2019.01); *G06F 16/951* (2019.01); *H04L 63/1425* (2013.01); *H04L 63/1441* (2013.01)

(58) Field of Classification Search
CPC . H04L 63/20; H04L 63/1425; H04L 63/1441; G06F 16/2477; G06F 16/951
See application file for complete search history.

(56) References Cited

U.S. PATENT DOCUMENTS 7,818,224 B2 10/2010 Boerner
7,818,417 B2 10/2010 Ginis et al.
(Continued)

FOREIGN PATENT DOCUMENTS

WO 0163534 A2 8/2001
WO 2015094545 A1 6/2015

OTHER PUBLICATIONS

Stoneburner, Gary, Alice Goguen, and Alexis Feringa. "Risk management guide for information technology systems." NIST special publication 800.30 (2002): 800-30 (Year: 2002).*

*Primary Examiner* — Ghodrat Jamshidi
(74) *Attorney, Agent, or Firm* — Galvin Patent Law LLC; Brian R. Galvin

(57) ABSTRACT

A system for fully integrated collection of business impacting data, analysis of that data and generation of both analysis-driven business decisions and analysis driven simulations of alternate candidate business actions has been devised and reduced to practice. This business operating system may be used predict the outcome of enacting candidate business decisions based upon past and current business data retrieved from both within the corporation and from a plurality of external sources pre-programmed into the system. Both single parameter set and multiple parameter set analyses are supported. Risk to value estimates of candidate decisions are also calculated.

15 Claims, 8 Drawing Sheets

Related U.S. Application Data which is a continuation-in-part of application No. 17/008,276, filed on Aug. 31, 2020, now Pat. No. 11,323,484, which is a continuation-in-part of application No. 17/000,504, filed on Aug. 24, 2020, now Pat. No. 11,477,245, which is a continuation-in-part of application No. 16/855,724, filed on Apr. 22, 2020, now Pat. No. 11,218,510, which is a continuation-in-part of application No. 16/836,717, filed on Mar. 31, 2020, now Pat. No. 10,917,428, and a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, said application No. 17/189,161 is a continuation-in-part of application No. 16/709,598, filed on Dec. 10, 2019, now Pat. No. 11,507,858, said application No. 17/000,504 is a continuation-in-part of application No. 16/412,340, filed on May 14, 2019, now Pat. No. 11,539,663, which is a continuation-in-part of application No. 16/267,893, filed on Feb. 5, 2019, now abandoned, which is a continuation-in-part of application No. 16/248,133, filed on Jan. 15, 2019, now abandoned, said application No. 16/836,717 is a continuation-in-part of application No. 15/887,496, filed on Feb. 2, 2018, now Pat. No. 10,783,241, said application No. 17/061,195 is a continuation-in-part of application No. 15/879,801, filed on Jan. 25, 2018, now abandoned, said application No. 16/248,133 is a continuation-in-part of application No. 15/849,901, filed on Dec. 21, 2017, now Pat. No. 11,023,284, which is a continuation-in-part of application No. 15/835,436, filed on Dec. 7, 2017, now Pat. No. 10,572,828, and a continuation-in-part of application No. 15/835,312, filed on Dec. 7, 2017, now Pat. No. 11,055,451, said application No. 16/720,383 is a continuation of application No. 15/823,363, filed on Nov. 27, 2017, now Pat. No. 10,560,483, said application No. 15/887,496 is a continuation-in-part of application No. 15/823,285, filed on Nov. 27, 2017, now Pat. No. 10,740,096, and a continuation-in-part of application No. 15/818,733, filed on Nov. 20, 2017, now Pat. No. 10,673,887, said application No. 16/248,133 is a continuation-in-part of application No. 15/813,097, filed on Nov. 14, 2017, now abandoned, and a continuation-in-part of application No. 15/806,697, filed on Nov. 8, 2017, now abandoned, said application No. 15/835,436 is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, said application No. 15/823,285 is a continuation-in-part of application No. 15/788,718, filed on Oct. 19, 2017, now Pat. No. 10,861,014, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, said application No. 15/818,733 is a continuation-in-part of application No. 15/725,274, filed on Oct. 4, 2017, now Pat. No. 10,609,079, said application No. 15/823,363 is a continuation-in-part of application No. 15/725,274, filed on Oct. 4, 2017, now Pat. No. 10,609,079, said application No. 16/248,133 is a continuation-in-part of application No. 15/673,368, filed on Aug. 9, 2017, now abandoned, said application No. 15/725,274 is a continuation-in-part of application No. 15/655,113, filed on Jul. 20, 2017, now Pat. No. 10,735,456, said application No. 15/813,097 is a continuation-in-part of application No. 15/616,427, filed on Jun. 7, 2017, now abandoned, said application No. 15/655,113 is a continuation-in-part of application No. 15/616,427, filed on Jun. 7, 2017, now abandoned, said application No. 15/790,327 is a continuation-in-part of application No. 15/616,427, filed on Jun. 7, 2017, now abandoned, said application No. 15/787,601 is a continuation-in-part of application No. 15/616,427, filed on Jun. 7, 2017, now abandoned, said application No. 15/879,801 is a continuation-in-part of application No. 15/379,899, filed on Dec. 15, 2016, now abandoned, said application No. 15/673,368 is a continuation-in-part of application No. 15/376,657, filed on Dec. 13, 2016, now Pat. No. 10,402,906, said application No. 15/806,697 is a continuation-in-part of application No. 15/376,657, filed on Dec. 13, 2016, now Pat. No. 10,402,906, said application No. 15/379,899 is a continuation-in-part of application No. 15/376,657, filed on Dec. 13, 2016, now Pat. No. 10,402,906, said application No. 15/806,697 is a continuation-in-part of application No. 15/343,209, filed on Nov. 4, 2016, now Pat. No. 11,087,403, said application No. 15/376,657 is a continuation-in-part of application No. 15/237,625, filed on Aug. 15, 2016, now Pat. No. 10,248,910, said application No. 15/655,113 is a continuation-in-part of application No. 15/237,625, filed on Aug. 15, 2016, now Pat. No. 10,248,910, said application No. 15/343,209 is a continuation-in-part of application No. 15/237,625, filed on Aug. 15, 2016, now Pat. No. 10,248,910, and a continuation-in-part of application No. 15/229,476, filed on Aug. 5, 2016, now Pat. No. 10,454,791, said application No. 15/237,625 is a continuation-in-part of application No. 15/206,195, filed on Jul. 8, 2016, now abandoned, said application No. 15/229,476 is a continuation-in-part of application No. 15/206,195, filed on Jul. 8, 2016, now abandoned, which is a continuation-in-part of application No. 15/186,453, filed on Jun. 18, 2016, now abandoned, said application No. 15/835,312 is a continuation-in-part of application No. 15/186,453, filed on Jun. 18, 2016, now abandoned, which is a continuation-in-part of application No. 15/166,158, filed on May 26, 2016, now abandoned, said application No. 15/790,327 is a continuation-in-part of application No. 15/141,752, filed on Apr. 28, 2016, now Pat. No. 10,860,962, said application No. 15/166,158 is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, said application No. 16/709,598 is a continuation-in-part of application No. 14/925,974, filed on Oct. 28, 2015, now abandoned, said application No. 15/616,427 is a continuation-in-part of application No. 14/925,974, filed on Oct. 28, 2015, now abandoned, said application No. 15/141,752 is a continuation-in-part of application No. 14/925,974, filed on Oct. 28, 2015, now abandoned.

(60) Provisional application No. 62/568,298, filed on Oct. 4, 2017, provisional application No. 62/568,312, filed on Oct. 4, 2017, provisional application No. 62/568,305, filed on Oct. 4, 2017, provisional application No. 62/568,291, filed on Oct. 4, 2017, provisional application No. 62/568,307, filed on Oct. 4, 2017.

(56) References Cited

U.S. PATENT DOCUMENTS

| | | | |
|---|---|---|---|
| 7,840,677 B2 | 11/2010 | Li et al. | |
| 8,019,631 B2* | 9/2011 | Bredin | G06Q 10/063 705/7.11 |
| 8,069,190 B2 | 11/2011 | Mccoll et al. | |
| 8,156,029 B2 | 4/2012 | Szydlo et al. | |
| 8,195,503 B2* | 6/2012 | Furin | G06Q 10/067 705/7.36 |
| 8,200,527 B1* | 6/2012 | Thompson | G06Q 30/00 705/7.41 |
| 8,244,567 B2* | 8/2012 | Estill | G06Q 30/02 705/7.14 |
| 8,311,863 B1* | 11/2012 | Kemp | G06Q 10/0639 705/7.29 |
| 8,352,347 B2 | 1/2013 | Thomas et al. | |
| 8,370,192 B2 | 2/2013 | Deo et al. | |
| 8,818,838 B1* | 8/2014 | Sharma | G06Q 30/0202 705/7.29 |
| 9,338,061 B2 | 5/2016 | Chen et al. | |
| 9,461,876 B2 | 10/2016 | Van Dusen et al. | |
| 9,639,575 B2 | 5/2017 | Leida et al. | |
| 9,721,086 B2 | 8/2017 | Shear et al. | |
| 10,168,691 B2 | 1/2019 | Zornio et al. | |
| 10,681,060 B2* | 6/2020 | Scheidler | G06N 20/00 |
| 10,740,358 B2 | 8/2020 | Chan et al. | |
| 2005/0209993 A1 | 9/2005 | Koehler | |
| 2007/0168370 A1 | 7/2007 | Hardy | |
| 2007/0174233 A1 | 7/2007 | Ginis et al. | |
| 2009/0164297 A1* | 6/2009 | Bal | G06Q 30/02 705/7.12 |
| 2009/0171999 A1 | 7/2009 | Mccoll et al. | |
| 2009/0235251 A1 | 9/2009 | Li et al. | |
| 2012/0116850 A1* | 5/2012 | Abe | G06Q 10/067 705/7.38 |
| 2012/0215574 A1* | 8/2012 | Driessnack | G06Q 10/0639 705/7.12 |
| 2013/0262443 A1 | 10/2013 | Leida et al. | |
| 2013/0290035 A1* | 10/2013 | Jones | G06Q 10/10 705/4 |
| 2013/0290554 A1 | 10/2013 | Chen et al. | |
| 2014/0129269 A1* | 5/2014 | Rey | G06Q 10/06393 705/7.12 |
| 2015/0254330 A1 | 9/2015 | Chan et al. | |
| 2016/0092557 A1 | 3/2016 | Stojanovic et al. | |
| 2016/0098037 A1 | 4/2016 | Zornio et al. | |
| 2016/0346696 A1* | 12/2016 | Liu | A63F 13/355 |
| 2016/0358102 A1 | 12/2016 | Bowers et al. | |
| 2017/0006135 A1 | 1/2017 | Siebel et al. | |
| 2017/0019421 A1* | 1/2017 | Hebert | G06F 21/577 |
| 2017/0090893 A1 | 3/2017 | Aditya et al. | |
| 2019/0155646 A1 | 5/2019 | Bishop et al. | |

* cited by examiner

SYSTEM FOR AUTOMATED CAPTURE AND ANALYSIS OF BUSINESS INFORMATION FOR RELIABLE BUSINESS VENTURE OUTCOME PREDICTION

CROSS-REFERENCE TO RELATED APPLICATIONS

Priority is claimed in the application data sheet to the following patents or patent applications, each of which is expressly incorporated herein by reference in its entirety:
Ser. No. 17/189,161
Ser. No. 17/061,195
Ser. No. 17/035,029
Ser. No. 17/008,276
Ser. No. 17/000,504
Ser. No. 16/855,724
Ser. No. 16/836,717
Ser. No. 15/887,496
Ser. No. 15/823,285
Ser. No. 15/788,718
Ser. No. 15/788,002
Ser. No. 15/787,601
Ser. No. 62/568,312
Ser. No. 15/616,427
Ser. No. 14/925,974
Ser. No. 62/568,305
Ser. No. 62/568,307
Ser. No. 15/818,733
Ser. No. 15/725,274
Ser. No. 15/655,113
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536
Ser. No. 16/777,270
Ser. No. 16/720,383
Ser. No. 15/823,363
Ser. No. 16/412,340
Ser. No. 16/267,893
Ser. No. 16/248,133
Ser. No. 15/849,901
Ser. No. 15/835,436
Ser. No. 15/790,457
Ser. No. 15/790,327
Ser. No. 62/568,291
Ser. No. 62/568,298
Ser. No. 15/835,312
Ser. No. 15/813,097
Ser. No. 15/806,697
Ser. No. 15/376,657
Ser. No. 15/343,209
Ser. No. 15/229,476
Ser. No. 15/673,368
Ser. No. 15/879,801
Ser. No. 15/379,899
Ser. No. 16/709,598

BACKGROUND OF THE INVENTION

Field of the Art

The present invention is in the field of use of computer systems in business information management, operations and predictive planning. Specifically, the assembly of a system that integrates the functions of business information and operating data, complex data analysis and use of that data, preprogrammed commands and parameters and machine learning to create a business operating system capable of reliable predictive decision making and action path outcome simulation herein as applied to business venture outcome and the calculated risk to capital of predictive pathways.

Discussion of the State of the Art

Over the past decade, the amount of financial, operational, infrastructure, risk management and philosophical information available to decision makers of a business from such sources as ubiquitous sensors found on a business's equipment or available from third party sources, detailed cause and effect data, and business process monitoring software has expanded to the point where the data has overwhelmed corporate executives' abilities to follow all of it and certainly to interpret and make meaningful use of that available data in a given business environment. In other words, the torrent of business-related information now available to a corporate decision maker or group of decision makers has far outgrown the ability of those in most need of its use to either fully follow it or reliably use it. Failure to recognize important trends or become aware of information in a timely fashion has led to highly visible, customer facing, outages at NETFLIX™, FACEBOOK™, and UPS™ over the past few years, just to list a few.

There have been several developments in business software that have arisen with the purpose of streamlining or automating either business data analysis or business decision process. PLANATIR™ offers software to isolate patterns in large volumes of data, DATABRICKS™ offers custom analytics services, ANAPLAN™ offers financial impact calculation services and there are other software sources that mitigate some aspect of business data relevancy identification, analysis of that data and business decision automation, but none of these solutions handle more than a single aspect of the whole task. This insinuates the technology being used in the decision process as one of the variables as data from one software package often must be significantly and manually transformed to be introduced into the software for the next analysis, if appropriate software exists. This step is both inefficient use of human resources and has potential to introduce error at a critical process point.

What is needed is a fully integrated system that retrieves business relevant information from many diverse sources, identifies and analyzes that high volume data, transforming it to a business useful format and then uses that data to create intelligent predictive business decisions and business pathway simulations, including reliable risk to value estimates. Forming a "business operating system."

SUMMARY OF THE INVENTION

Accordingly, the inventor has developed a distributed system for the fully integrated retrieval, and deep analysis of business operational information from a plurality of sources. The system further uses results of business information analytics to optimize the making of business decisions and allow for alternate action pathways to be simulated using the latest data and machine mediated prediction algorithms. Specifically, portions of the system are applied to the areas reliably predicting the outcomes of differential business decision paths and prediction of risk to business value for each set of decision choices.

According to a preferred embodiment of the invention, a system for fully integrated collection of business impacting data, analysis of that data and generation of both analysis driven business decisions and analysis driven simulations of alternate candidate business decision comprising: a business data retrieval engine stored in a memory of and operating on a processor of a computing device, a business data analysis engine stored in a memory of and operating on a processor of a computing device and a business decision and business action path simulation engine stored in a memory of and operating on a processor of one of more computing devices. The business information retrieval engine: retrieves a plurality of business-related data from a plurality of sources, accepts a plurality of analysis parameters and control commands directly from human interface devices or from one or more command and control storage devices and stores accumulated retrieved information for processing by data analysis engine or predetermined data timeout. The business information analysis engine: retrieves a plurality of data types and sources from the business information retrieval engine, and performs a plurality of analytical functions and transformations on retrieved data based upon the specific goals and needs set forth in a current campaign by business process analysis authors. The business decision and business action path simulation engine: employs results of data analyses and transformations performed by the business information analysis engine, together with available supplemental data from a plurality of sources as well as any current campaign specific machine learning, commands and parameters from business process analysis authors to formulate current business operations and risk status reports and employs results of data analyses and transformations performed by the business information analysis engine, together with available supplemental data from a plurality of sources, any current campaign specific commands and parameters from business process analysis authors, as well as input gleaned from machine learning algorithms to deliver business action pathway simulations and business decision support to a first end user.

According to another embodiment of the invention, a system for fully integrated collection of business impacting data, analysis of that data and generation of both analysis-driven business decisions and analysis-driven simulations of alternate candidate business decision comprising: a business data retrieval engine stored in a memory of and operating on a processor of a computing device, a business data analysis engine stored in a memory of and operating on a processor of a computing device, and an automated planning and value at risk estimation module stored in a memory of and operating on a processor of one of more computing devices. The business information retrieval engine: retrieves a plurality of business-related data from a plurality of sources, accepts a plurality of analysis parameters and control commands directly from human interface devices or from one or more command and control storage devices, and stores accumulated retrieved information for processing by data analysis engine or predetermined data timeout. The business information analysis engine: retrieves a plurality of data types from the business information retrieval engine, and performs a plurality of analytical functions and transformations on retrieved data based upon the specific goals and needs set forth in a current campaign by business process analysis authors. The automated planning and value at risk estimation module: employs results of data analyses and transformations performed by the business information analysis engine, together with available supplemental data from a plurality of sources as well as any current campaign specific machine learning, commands and parameters from business process analysis authors to formulate current business planning and risk status reports, and employs results of data analyses and transformations performed by the business information analysis engine, together with available supplemental data from a plurality of sources, any current campaign specific commands and parameters from business process analysis authors, as well as input gleaned from machine learned algorithms to deliver business decision pathway simulations and business value at risk support to a first end user.

According to another embodiment of the invention, a system for fully integrated collection of business impacting data, analysis of that data and generation of both analysis-driven business decisions and analysis-driven simulations of alternate candidate business decision comprising: A business information retrieval engine stored in the memory of and operating on a processor of a computing device, employs a portal for human interface device input at least a portion of which are business-related data and at least another portion of which are commands and parameters related to the conduct of a current business venture campaign alternatives. An automated planning and value at risk estimation module uses at least information theory based statistical analysis to reliably predict future outcome of current business decision based analyzed previous data. An automated planning and value at risk estimation module uses at least Monte Carlo heuristic model value at risk principles to reliably estimate future value at risk figures of current business decision based analyzed previous data. An automated planning and value at risk estimation module uses a specifically designed graph-based data store service to efficiently store and manipulate the large data structures created during business decision outcome analysis. An automated planning and value at risk estimation module has job control function that allows both jobs that run in a single iteration with a single set of parameters and jobs that include multiple iterations and sets of predetermined sets of parameters with termination criteria to stop execution when desired analysis results are obtained. Some jobs are run offline in a batch like mode and other jobs are run online in an interactive mode where users enter parameters for subsequent iterations based upon results of previous iterations until a predesigned analysis result terminates execution According to a preferred embodiment of the invention, a method for fully integrated collection of business impacting data, analysis of that data and generation of both analysis-driven business decisions and analysis-driven simulations of alternate candidate business decision, the method comprising the steps of: a) receiving business decision parameters and objectives using a client access interface stored in a memory of and operating on a processor of a computing device; b) retrieving a plurality of business data from a plurality of sources using a business data retrieval engine stored in a memory of and operating on a processor of a computing device; c) transforming retrieved business data to forms useful for support of business decision support using a business data analysis engine stored in a memory of and operating on a processor of a computing device; d) predicting the outcome of predetermined business decision candidates and estimating the value at risk attached to each candidate using an automated planning and value at risk estimation module stored in a memory of and operating on a processor of one of more computing devices;

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE INVENTION

Figure 1:
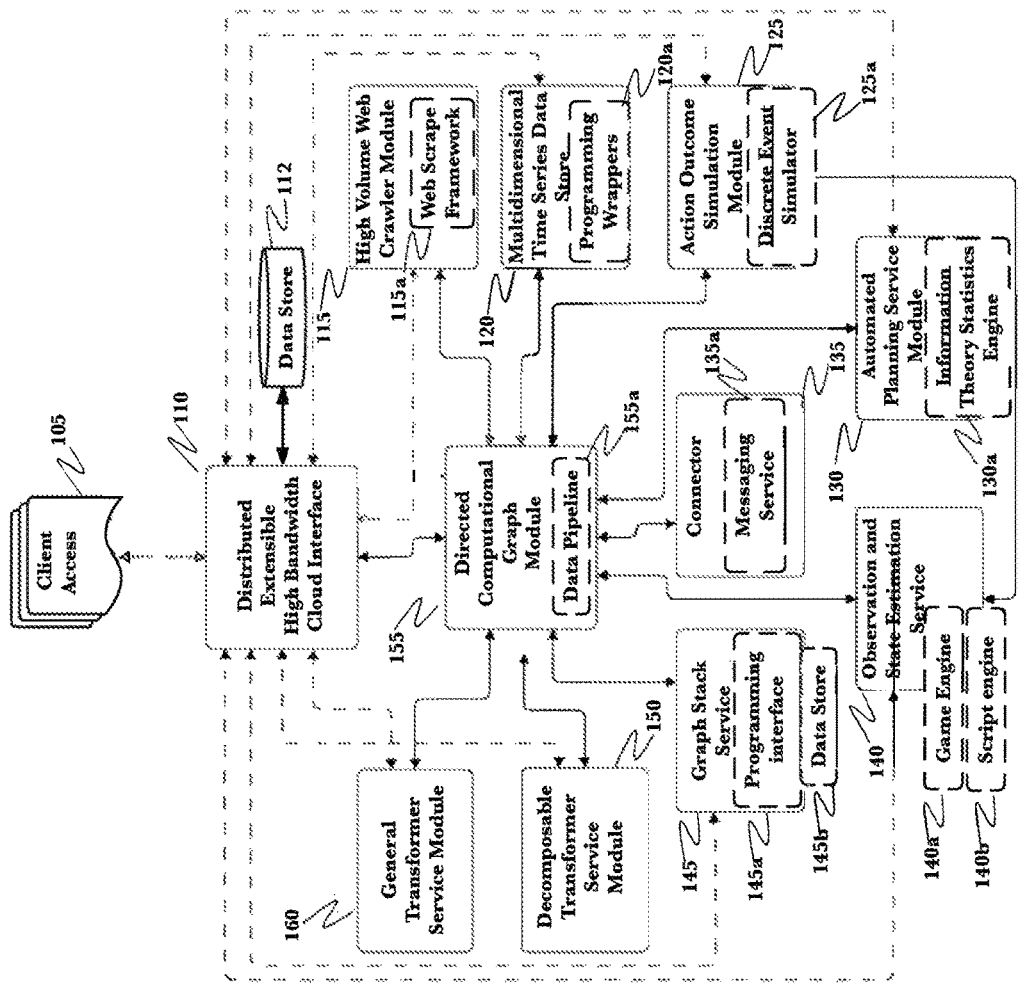
FIG. 1 is a diagram of an exemplary architecture of a business operating system according to an embodiment of the invention.

The inventor has conceived, and reduced to practice, a system and method for fully integrated capture and analysis of business information resulting in predictive decision making and simulation.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example, a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane can transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

Conceptual Architecture

FIG. 1 is a diagram of an exemplary architecture of a business operating system 100 according to an embodiment of the invention. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud-based sources, also enter the system through the cloud interface 110, data being passed to the analysis and transformation components of the system, the directed computational graph module 155, high volume web crawler module 115, multidimensional time series database 120 and the graph stack service. The directed computational graph module 155 retrieves one or more streams of data from a plurality of sources, which includes, but is in no way not limited to, a plurality of physical sensors, web-based questionnaires and surveys, monitoring of electronic infrastructure, crowd sourcing campaigns, and human input device information. Within the directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high-volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series database module 120 receives data from a large plurality of sensors that may be of several different types. The module is designed to accommodate irregular and high-volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph data store 145b such as GIRAPH™ or a key value pair type data store REDIS™, or RIAK™, among others, all of which are suitable for storing graph represented information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data. For example, the pipelines operations department has reported a very small reduction in crude oil pressure in a section of pipeline in a highly remote section of territory. Many believe the issue is entirely due to a fouled, possibly failing flow sensor, others believe that it is a proximal upstream pump that may have foreign material stuck in it. Correction of both of these possibilities is to increase the output of the effected pump to hopefully clean out it or the fouled sensor. A failing sensor will have to be replaced at the next maintenance cycle. A few, however, feel that the pressure drop is due to a break in the pipeline, probably small at this point, but even so, crude oil is leaking and the remedy for the fouled sensor or pump option could make the leak much worse and waste much time afterwards. The company does have a contractor about 8 hours away, or could rent satellite time to look but both of those are expensive for a probable sensor issue, significantly less than cleaning up an oil spill though and then with significant negative public exposure. These sensor issues have happened before and the business operating system 100 has data from them, which no one really studied due to the great volume of columnar figures, so the alternative courses 125, 140 of action are run. The system, based on all available data, predicts that the fouled sensor or pump is unlikely to be the root cause this time due to other available data, and the contractor is dispatched. She finds a small breach in the pipeline. There will be a small cleanup and the pipeline needs to be shut down for repair but multiple tens of millions of dollars have been saved. This is just one example of a great many of the possible use of the business operating system, those knowledgeable in the art will easily formulate more.

Figure 2:
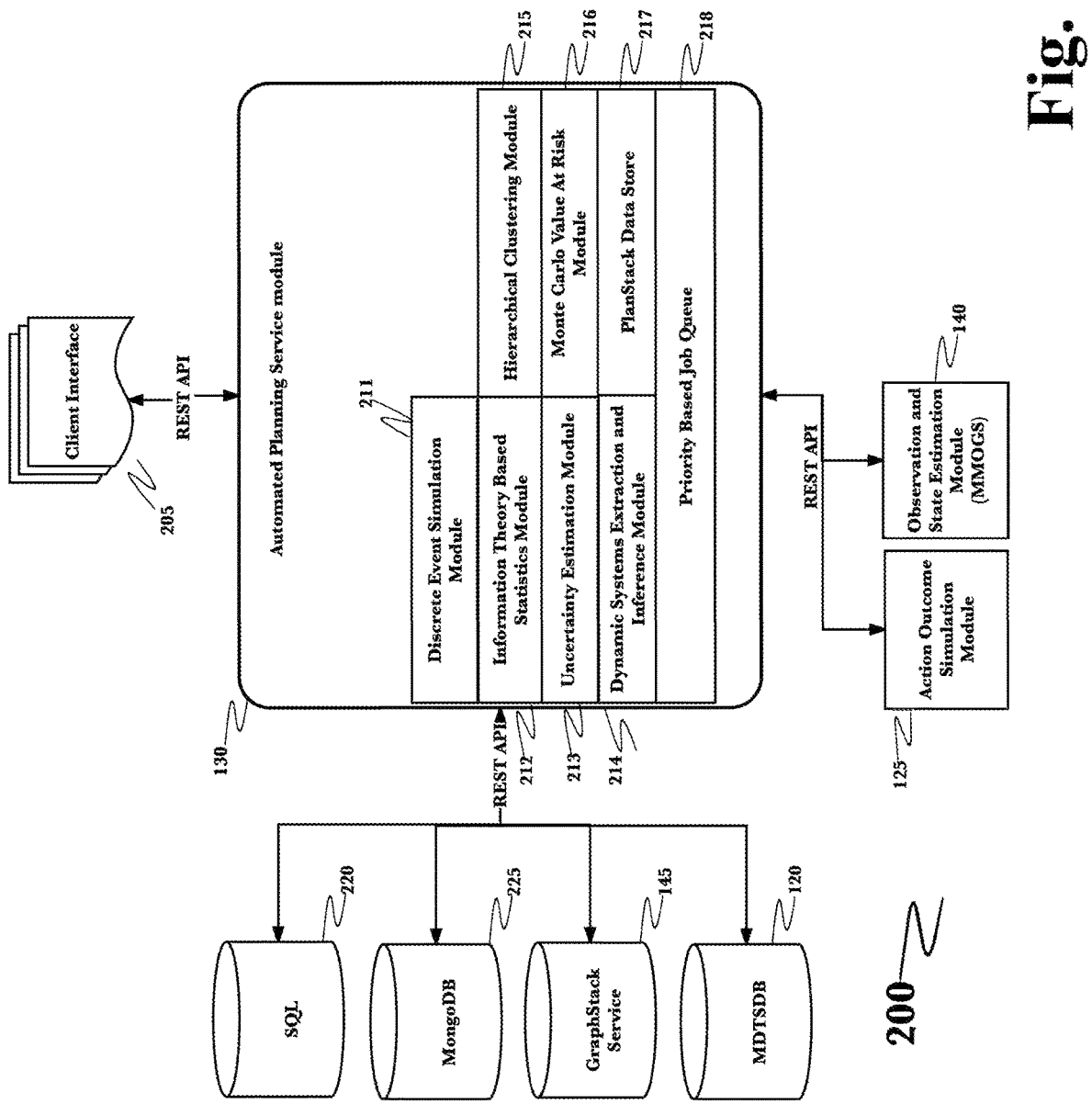
FIG. 2 is a diagram of an exemplary architecture of an automated planning service cluster and related modules according to an embodiment of the invention.

FIG. 2 is a diagram of an exemplary architecture of an automated planning service module and related modules according to an embodiment of the invention. Seen here is a more detailed view of the automated planning service module 130 as depicted in FIG. 1. The module functions by receiving business decision or business venture candidates as well as relevant currently available related data and any campaign analysis modification commands through a client interface 205. Significant amounts of supporting information such as, but not restricted to current business conditions, infrastructure, ongoing venture status, financial status, market conditions, and world events which may impact the current decision or venture that have been collected by the business operating system as a whole and stored in such data stores as the multidimensional times series database 120, the analysis capabilities of the directed computational graph module 155 and web-based data retrieval abilities of the high-volume web crawler module 115 all of which may be stored in one or more data stores 220, 225 may also be used during simulation of alternative business decision progression, which may entail such variables as, but are not limited to implementation timing, method to end changes, order and timing of constituent part completion or impact of choosing another goal instead of an action currently under analysis.

Contemplated actions may be broken up into a plurality of constituent events that either act towards the fulfillment of the venture under analysis or represent the absence of each event by the discrete event simulation module 211 which then makes each of those events available for information theory based statistical analysis 212, which allows the current decision events to be analyzed in light of similar events under conditions of varying dis-similarity using machine learned criteria obtained from that previous data; results of this analysis in addition to other factors may be analyzed by an uncertainty estimation module 213 to further tune the level of confidence to be included with the finished analysis. Confidence level would, be a weighted calculation of the random variable distribution given to each event analyzed. Prediction of the effects of at least a portion of the events involved with a business venture under analysis within a system as complex as anything from the microenvironment in which the client business operates to more expansive arenas as the regional economy or further, from the perspective of success of the client business is calculated in dynamic systems extraction and inference module 214, which use, among other tools algorithms based upon Shannon entropy, Hartley entropy and mutual information dependence theory.

Of great importance in any business decision or new business venture is the amount of business value that is being placed at risk by choosing one decision over another. Often this value is monetary but it can also be competitive placement, operational efficiency or customer relationship based, for example: the may be the effects of keeping an older, possibly somewhat malfunctioning customer relationship management system one more quarter instead of replacing it for $14 million dollars and a subscription fee. The automated planning service module has the ability predict the outcome of such decisions per value that will be placed at risk using programming based upon the Monte Carlo heuristic model 216 which allows a single "state" estimation of value at risk. It is very difficult to anticipate the amount of computing power that will be needed to complete one or more of these business decision analyses which can vary greatly in individual needs and often are run with several alternatives concurrently. The invention is therefore designed to run on expandable clusters 215, in a distributed, modular, and extensible approach, such as, but not exclusively, offerings of Amazon's AWS. Similarly, these analysis jobs may run for many hours to completion and many clients may be anticipating long waits for simple "what if" options which will not affect their business operations in the near term while other clients may have come upon a pressing decision situation where they need alternatives as soon as possible. This is accommodated by the presence of a job queue that allows analysis jobs to be implemented at one of multiple priority levels from low to urgent. In case of a change in more hypothetical analysis jobs to more pressing, job priorities can also be changed during run without loss of progress using the priority-based job queue 218.

Structured plan analysis result data may be stored in either a general-purpose automated planning engine executing Action Notation Modeling Language (ANML) scripts for modeling which can be used to prioritize both human and machine-oriented tasks to maximize reward functions over finite time horizons 217 or through the graph-based data store 145, depending on the specifics of the analysis in complexity and time run.

Figure 3:
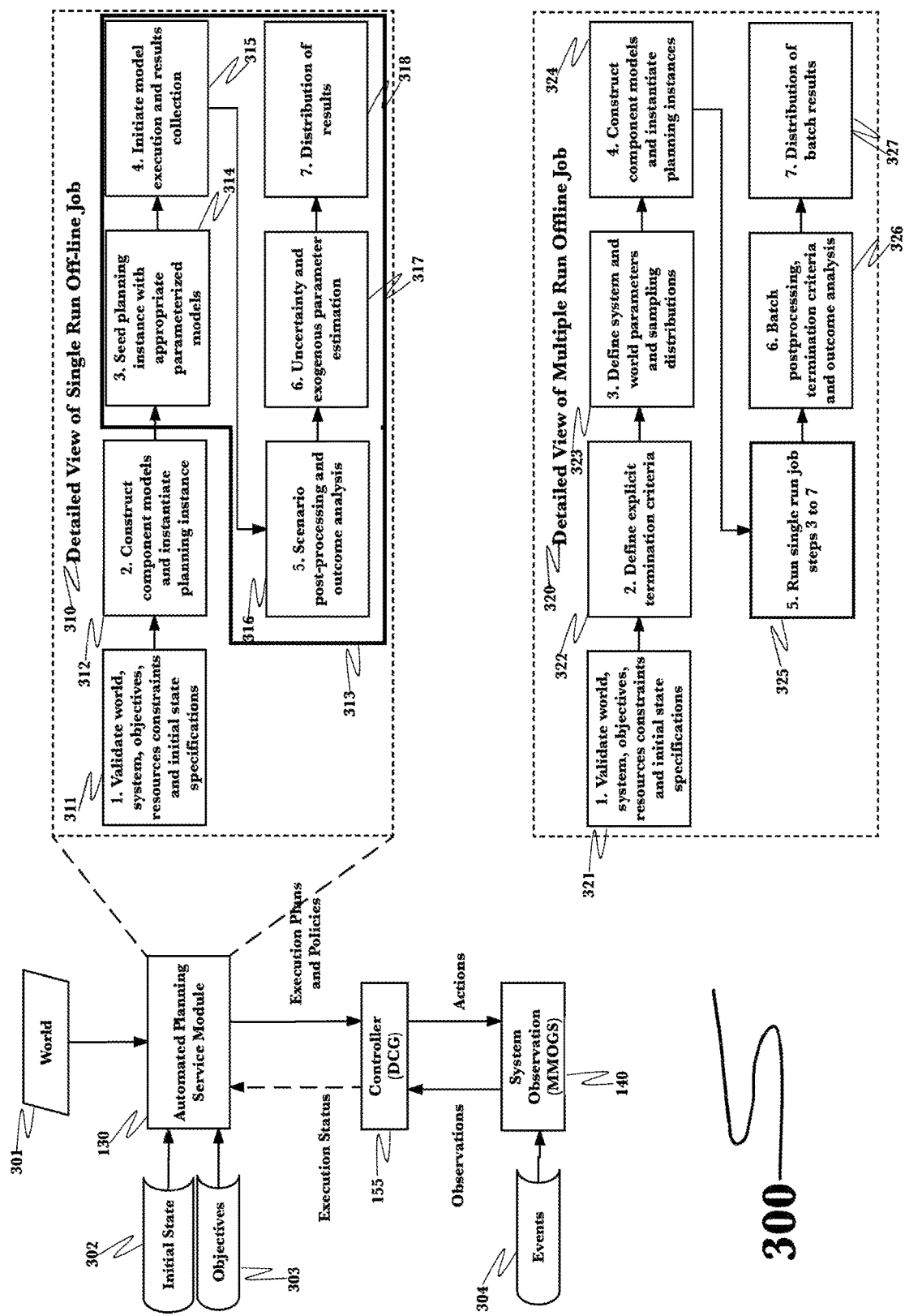
FIG. 3 is flow diagram illustrations of single run and multiple run offline automated planning service cluster jobs according to an embodiment of the invention.

The results of analyses may be sent to one of two client facing presentation modules, the action outcome simulation module 125 or the more visual simulation capable observation and state estimation module 140 depending on the needs and intended usage of the data by the client FIG. 3 is flow diagram illustrations of single run and multiple run offline automated planning service module jobs according to an embodiment of the invention. Offline jobs run using the automated planning service module can be either single run, which include one set of objective and conditional and run specific parameters 310 or multiple run which may contain multiple possible objectives multiple conditional and run specific parameters. Using the single run job 310 as a model, the job starts with the system 130 in its initial state and a set of business objectives being entered 303. All available data related to the objectives from various sources including the World Wide Web, sensors both physical sensors and logical sensors throughout the client company and any data obtained from sources know in the art are loaded 301. Prior to actual analysis run, all of the data is first sanity validated 311. Initial constructs are then created and the planning data structure instantiated as the populated framework for subsequent manipulation 312. The core of the analysis 313 may involve seeding the planning instance with the correct parameterized models 314, executing the models, possibly using the transformative power of the directed computational graph 155, followed by collection of the results of those model analyses 315 and then processing those results to align them with the intended scenarios. The outcome of business pathway analysis may be further analyzed 316 for characteristics such as the amount of uncertainty intrinsic to the results under the input conditions and estimation of impact exogenous parameters not included may have on the predictions 317. Finally, the results of the analysis, including confidence level information is distributed to the specifications of the service client who initiated the analysis 318. Result distribution may involve the observation and state estimation service module 155 and any event modifications programmed to assist in representation 304.

The progression of multiple run offline jobs 320 is quite similar to that above but allows for the analysis of business decisions where there may be multiple different values for one or more of the input parameters being used in the analysis such as where the client wants to change the time of implementation of a plan or where conditions are not accurately known. The invention is designed to accommodate any similar variances known to those skilled in the art. From the initial state 302 with known objectives loaded 303 and external data retrieved 301 the job is initialized in the automated planning service module 130. Once all parameters are validated 321, the explicit termination criteria for the multirun jobs is defined by the user 322, this could be as simple as all scenarios have been analyzed. The mode with which system and world parameters are sampled, once, each run, or some other distribution must also be defined 323. As with the single run job, initial constructs are then created and the planning data structure instantiated as the populated framework for subsequent manipulation 324. Steps 314, 315, 316, 317 and 318 are then run for each iteration 325. Finally, the culmination results for all job runs are batch post processed, termination criteria fulfillment confirmed and the outcome of the entire run is analyzed for success 326. A full accounting of system analysis is then distributed to the client 327.

Figure 4:
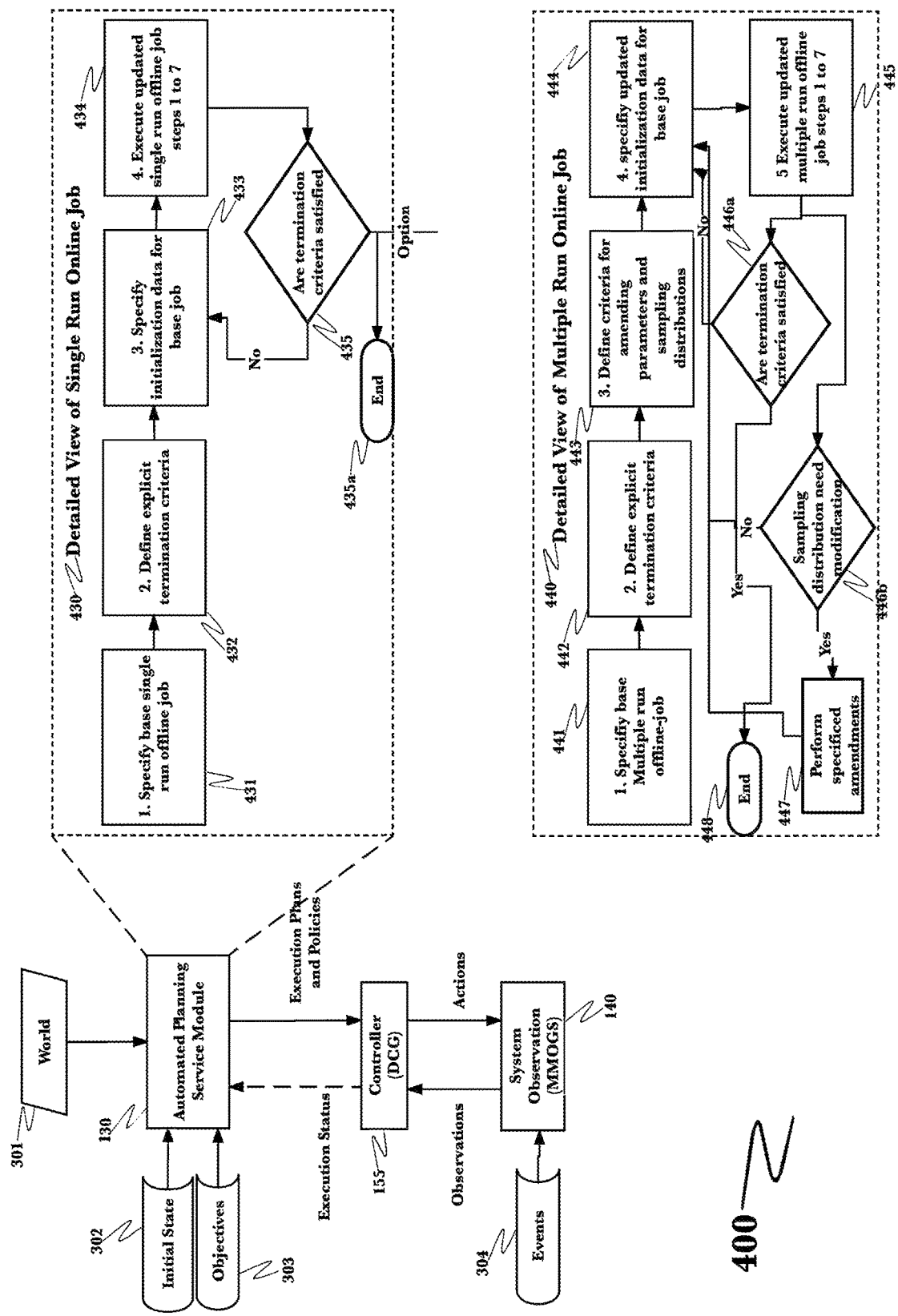
FIG. 4 is flow diagram illustrations of single run and multiple run online automated planning service cluster jobs according to an embodiment of the invention.

FIG. 4 is flow diagram illustrations of single run and multiple run online automated planning service module jobs according to an embodiment of the invention. There is occasion where the results of one run of a job may have an effect that requires the client to then manually enter parameters for the next iteration or where determination of which data set is entered next depends on the results of a previous job run for the sake of expediency. Under these conditions automated planning service module jobs may be run in a more interactive or online priority 430 and 440 where the client has control of the process for a negotiated amount of time. In all cases 430, 440 the analysis process begins exactly as that of the corresponding offline job type 431, 441. As the process is expected to continue for multiple iterations even for a simple, single type job, explicit termination conditions are set 432, 442. For the online single run type job the job then executes as per an offline single run job 434, however, at the end of each data entry cycle, instead of distributing the results and exiting 318, the explicit termination parameters, which may be the lack of further data entry is tested 435 and the analysis cycle re-run 434 with amended data 433 until the termination criteria are met 435 and the process exits 435a. Results are distributed after each cycle (not shown). The function of multiple run online jobs is quite similar but involves the definition of criteria for the amendment of parameters and sampling distributions as was seen in the offline counterpart 323, 443 otherwise iteration is controlled in the same fashion as for an online single run job 444, 445, 446 but sampling distribution modifications are evaluated after each cycle 446a, 446b. Any modifications sampling distributions, when present, are incorporated into subsequent iterations 447. When all parameters have been evaluated the cycles exit 448.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 5:
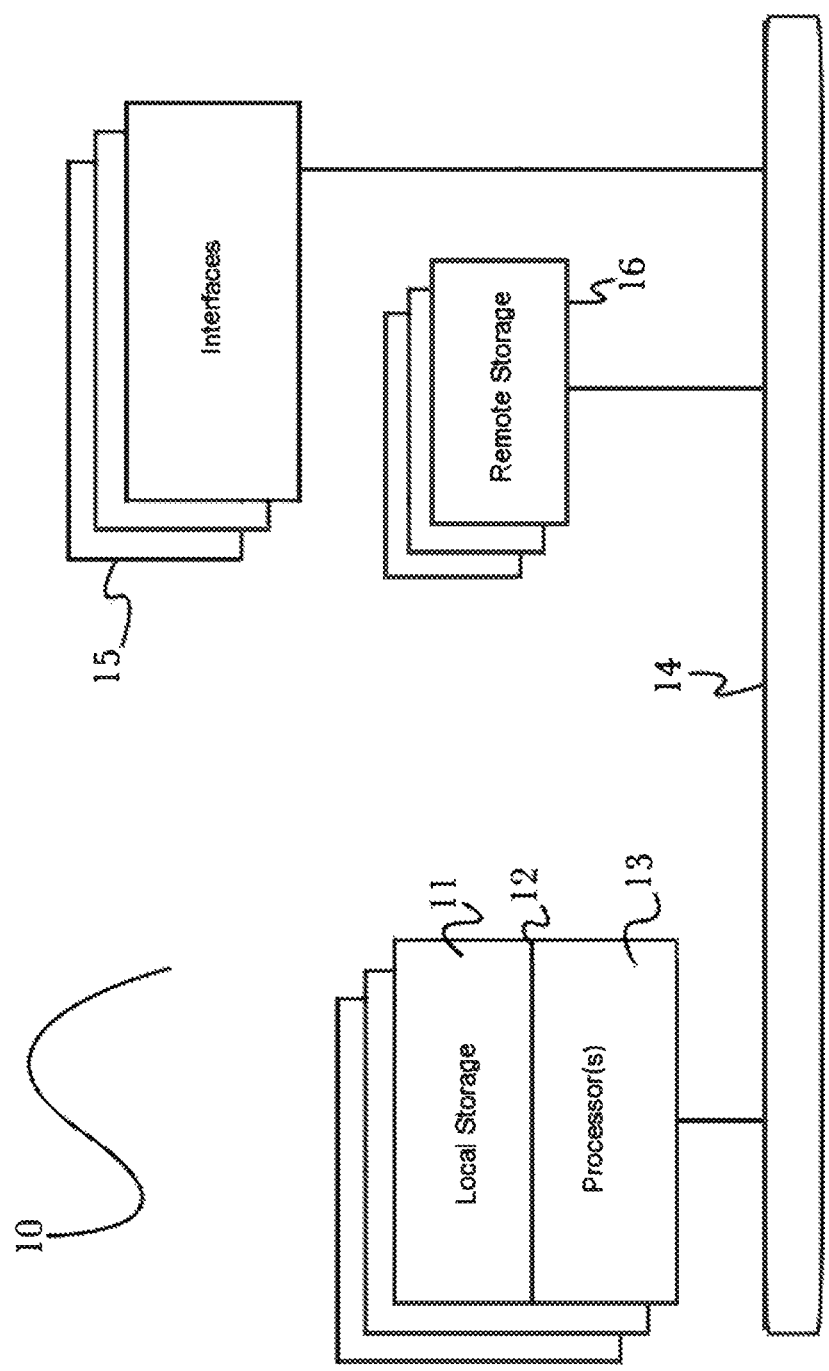
FIG. 5 is a block diagram illustrating an exemplary hardware architecture of a computing device used in various embodiments of the invention.

Referring now to FIG. 5, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 6:
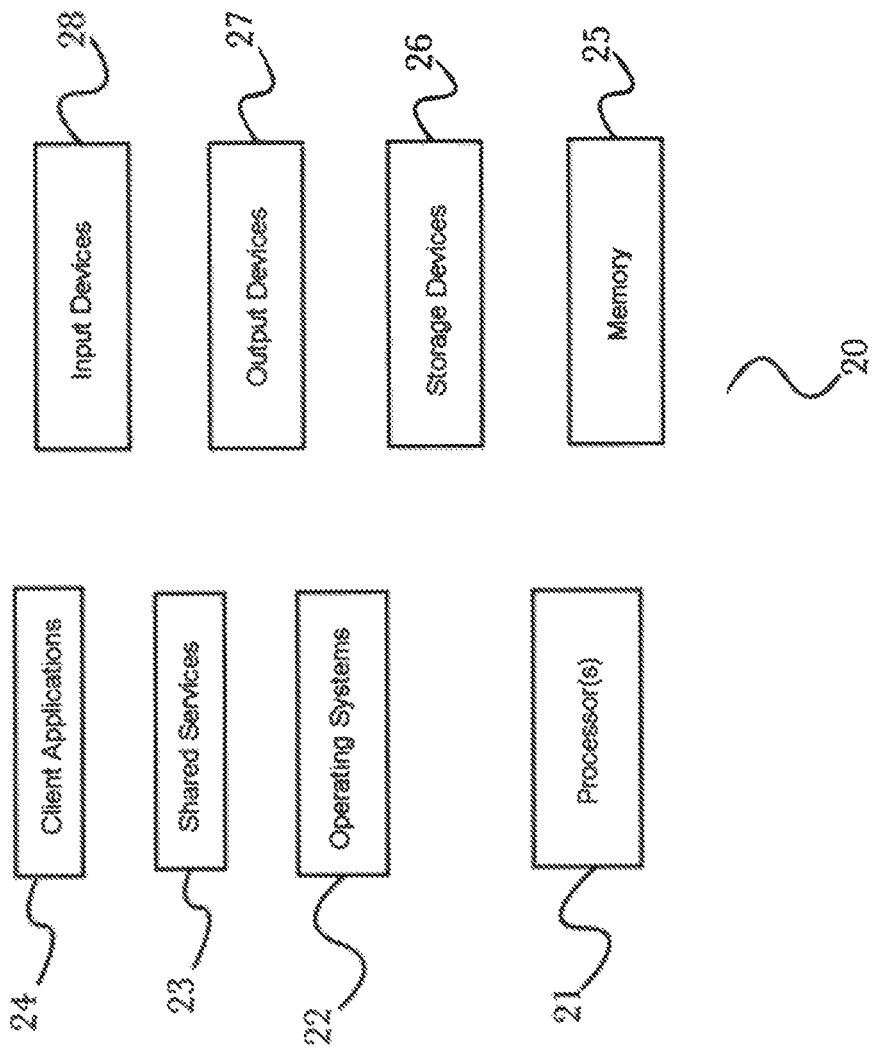
FIG. 6 is a block diagram illustrating an exemplary logical architecture for a client device, according to various embodiments of the invention.

In some embodiments, systems according to the present invention may be implemented on a standalone computing system. Referring now to FIG. 6, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, userspace common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 7:
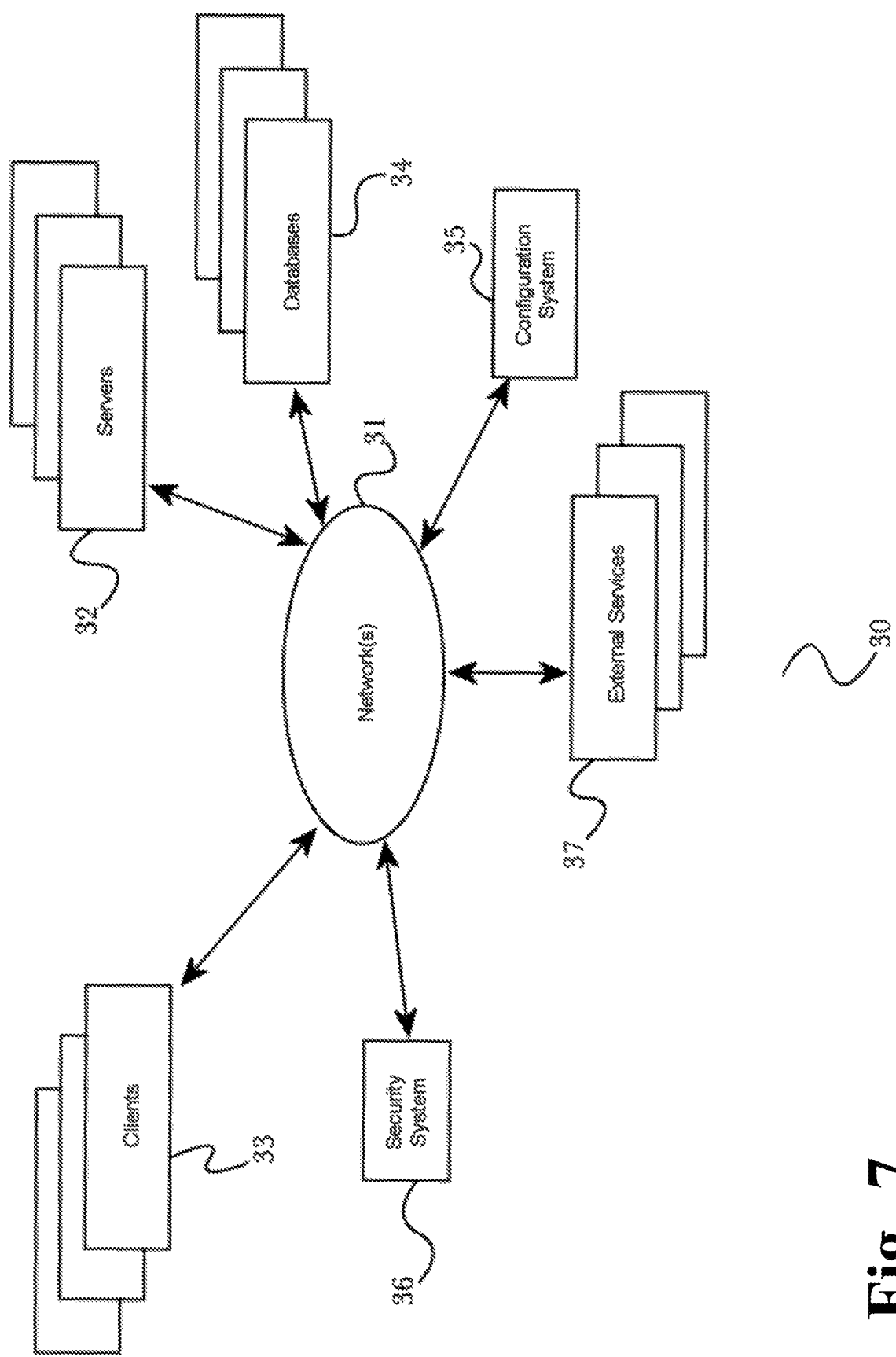
FIG. 7 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 7, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise webenabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 8:
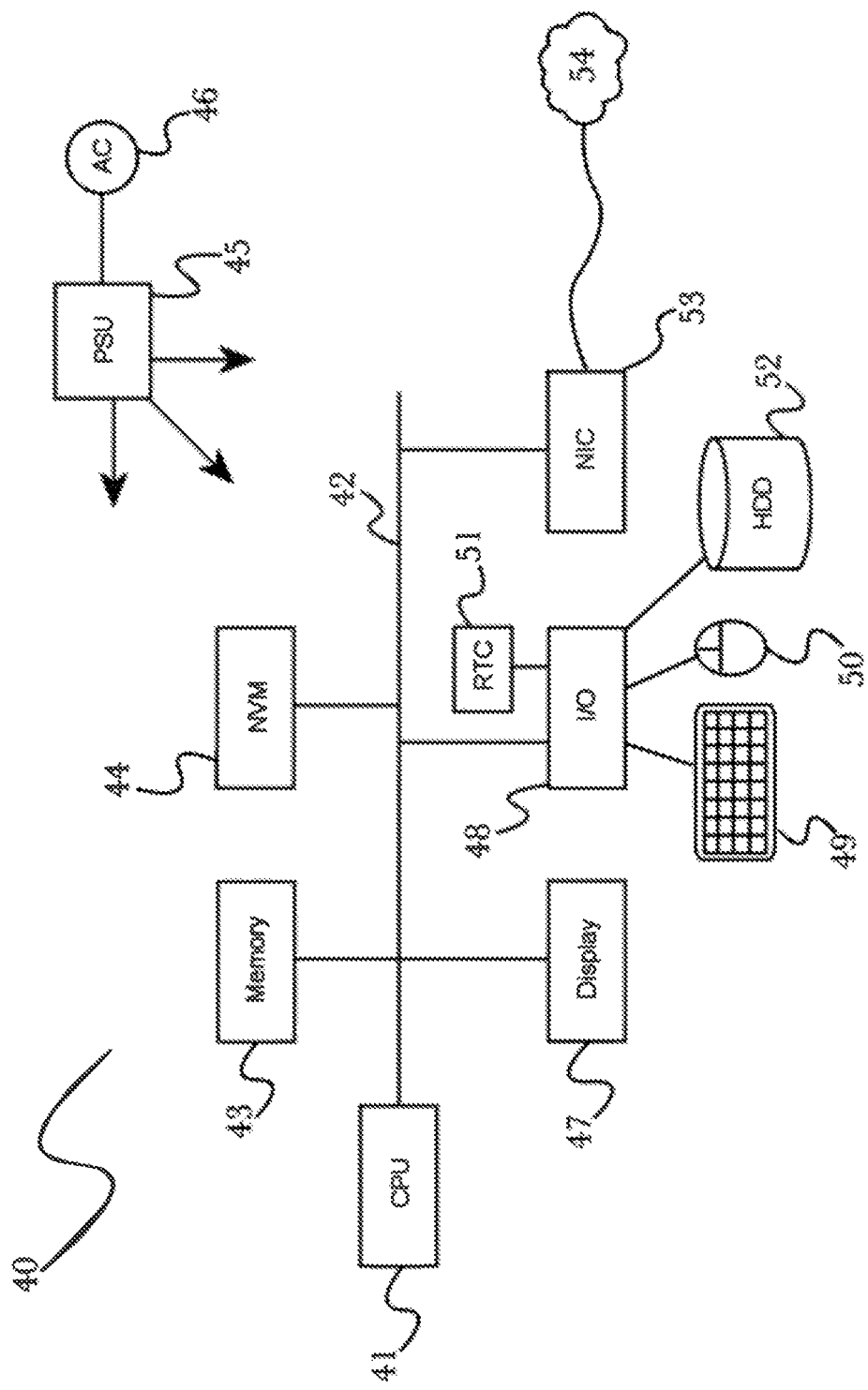
FIG. 8 is another block diagram illustrating an exemplary hardware architecture of a computing device used in various embodiments of the invention.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client.

The skilled person will be aware of a range of possible modifications of the various embodiments described above. Accordingly, the present invention is defined by the claims and their equivalents.

What is claimed is:

1. A system for fully integrated collection of business impacting data, analysis of that data and generation of both analysis-driven business decisions and analysis-driven simulations of alternate candidate business decisions comprising:
    a plurality of computing devices each comprising at least a processor, a memory, and a network interface;
    wherein a plurality of programming instructions stored in one or more of the memories and operating on one or more of the processors of the plurality of computing devices causes the plurality of computing devices to:
        retrieve a plurality of operational data and a plurality of operational goals;
        retrieve a plurality of analysis parameters and control commands;
        instantiate a plurality of analysis jobs on a distributed, cloud-based computing infrastructure, wherein:
            each analysis job comprises a comparison of one or more of the operational goals and a relevant portion of the operational data;
            at least one of the plurality of analysis parameters for each analysis job is unique to that analysis job;
            each analysis job generates a plurality of potential actions to be taken in order to move toward one or more of the operational goals;
            a confidence level is assigned to each of the potential actions as a weighted calculation of a random variable distribution of the comparison of the potential action with the operational data as impacted by the plurality of analysis parameters; and
            a result is obtained for each analysis job, the result comprising a probability of success based on the confidence level assigned to each of the potential actions considered in the respective analysis job;
        determine a plurality of planning risk parameters based on the results of each analysis job; and
        use the determined planning risk parameters as inputs to a parameterized discrete event simulation to automatically develop an operational plan that meets target operational goals.

2. The system of claim 1, wherein the system employs a portal for human interface device inputs.

3. The system of claim 1, wherein the system uses at least information theory-based statistical analysis to predict future outcomes of the potential actions based on analyzed previous data.

4. The system of claim 1, wherein the system uses at least Monte Carlo heuristic model value-at-risk principles to estimate future value-at-risk figures of the potential actions based on analyzed previous data.

5. The system of claim 1, wherein the system uses a specifically designed graph-based data store service to store and manipulate a plurality of large data structures created during operational outcome analysis.

6. The system of claim 1, wherein the system allows both analysis jobs that run in a single iteration with a single set of parameters and analysis jobs that include multiple iterations and sets of predetermined sets of parameters with termination criteria to stop execution when desired analysis results are obtained.

7. The system of claim 6, wherein some jobs are run offline in a batch mode and other jobs are run online in an interactive mode.

8. A method for fully integrated collection of business impacting data, analysis of that data and generation of both analysis-driven business decisions and analysis-driven simulations of alternate candidate business decisions comprising the steps of:
    retrieving a plurality of operational data and a plurality of operational goals;
    retrieving a plurality of analysis parameters and control commands;
    instantiating a plurality of analysis jobs on a distributed, cloud-based computing infrastructure, wherein:
        each analysis job comprises a comparison of one or more of the operational goals and a relevant portion of the operational data;
        at least one of the plurality of analysis parameters for each analysis job is unique to that analysis job;
        each analysis job generates a plurality of potential actions to be taken in order to move toward one or more of the operational goals;
        a confidence level is assigned to each of the potential actions as a weighted calculation of a random variable distribution of the comparison of the potential action with the operational data as impacted by the plurality of analysis parameters; and
        a result is obtained for each analysis job, the result comprising a probability of success based on the confidence level assigned to each of the potential actions considered in the respective analysis job;
    determining a plurality of planning risk parameters based on the results of each analysis job; and using the determined planning risk parameters as inputs to a parameterized discrete event simulation to automatically develop an operational plan that meets target operational goals.

9. The method of claim 8, wherein the method employs a portal for human interface device inputs.

10. The method of claim 8, wherein the method uses at least information theory-based statistical analysis to predict future outcomes of the potential actions based on analyzed previous data.

11. The method of claim 8, wherein the system uses at least Monte Carlo heuristic model value-at-risk principles to estimate future value-at-risk figures of the potential actions based on analyzed previous data.

12. Method of claim 8, wherein the system uses a specifically designed graph-based data store service to store and manipulate a plurality of large data structures created during operational outcome analysis.

13. The method of claim 8, wherein the system allows both analysis jobs that run in a single iteration with a single set of parameters and analysis jobs that include multiple iterations and sets of predetermined sets of parameters with termination criteria to stop execution when desired analysis results are obtained.

14. The method of claim 13, wherein some jobs are run offline in a batch mode and other jobs are run online in an interactive mode.

15. A computer-readable, non-transitory medium comprising a plurality of programming instructions that, when operating on a plurality of computing devices each comprising at least a processor, a memory, and a network interface, cause the plurality of computing devices to carry out the method of claim 8.

* * * * *